United States Patent
Amitay et al.

(10) Patent No.: US 8,024,324 B2
(45) Date of Patent: Sep. 20, 2011

(54) INFORMATION RETRIEVAL WITH UNIFIED SEARCH USING MULTIPLE FACETS

(75) Inventors: Einat Amitay, Shimshit (IL); David Carmel, Haifa (IL); Nadav Golbandi, Karkur (IL); Nadav Y Har'el, Haifa (IL); Shila Ofek-Koifman, Haifa (IL); Sivan Yogev, Meuchad (IL)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 12/164,139

(22) Filed: Jun. 30, 2008

(65) Prior Publication Data
US 2009/0327271 A1    Dec. 31, 2009

(51) Int. Cl.
*G06F 17/30* (2006.01)
(52) U.S. Cl. .......... 707/715; 707/723
(58) Field of Classification Search .......... 707/715, 707/723
See application file for complete search history.

(56) References Cited

U.S. PATENT DOCUMENTS

| | | | |
|---|---|---|---|
| 6,275,820 B1 | 8/2001 | Navin-Chandra et al. | |
| 7,346,613 B2 | 3/2008 | Hurst-Hiller et al. | |
| 2005/0050028 A1* | 3/2005 | Rose et al. | 707/3 |
| 2005/0149496 A1 | 7/2005 | Mukherjee et al. | |
| 2006/0059147 A1 | 3/2006 | Weiss et al. | |
| 2006/0294071 A1* | 12/2006 | Weare et al. | 707/3 |
| 2007/0112742 A1 | 5/2007 | Dumais et al. | |
| 2007/0239678 A1 | 10/2007 | Olkin et al. | |
| 2008/0215565 A1* | 9/2008 | Sun et al. | 707/5 |

\* cited by examiner

*Primary Examiner* — Charles Rones
*Assistant Examiner* — Mellissa M Chojnacki (57) ABSTRACT

A method for information retrieval with unified search between heterogeneous objects includes indexing a first object as a document in a search index; referencing a second object related to the first object in a facet of the document; and storing a relationship strength between the first and second objects in the facet of the document in the search index. Multiple heterogeneous objects can be related to the first object and referenced in multiple facets of the document, each with its relationship strength to the first object. Scoring an indirect object by indirect relation to a query object can be carried out by aggregating the relationship strengths between the indirect object and the retrieved objects multiplied by the retrieved objects' direct scores of relationship strength to the query object.

15 Claims, 9 Drawing Sheets

INFORMATION RETRIEVAL WITH UNIFIED SEARCH USING MULTIPLE FACETS

FIELD OF THE INVENTION

This invention relates to the field of information retrieval with unified search. In particular, the invention relates to unified search using multiple facets.

BACKGROUND OF THE INVENTION

Unified search, also known as heterogeneous interrelated entity search, is an emerging concept in information retrieval (IR). In unified search, the search space is expanded to represent heterogeneous information objects such as documents (web-pages, database records), users (authors, readers, taggers), user tags, as provided by collaborative bookmarking systems, and other object types. These objects might be related to each other in several relation types. For example, documents might relate to other documents by referencing each other; a user might be related to a document through authorship relation, as a tagger (a user bookmarking the document), as a reader, or as mentioned in the page's content; users might relate to other users through typical social network relations; and tags might relate to the bookmark they are associated with, and also to their taggers.

The IR system task over such a search space is to allow querying for all supported object types, and retrieving information objects of all types relevant to a given query. Typically, social search systems support searching for relevant documents and related users to a standard textual query, as well as searching for related documents and users for a specific user (or users).

One existing approach for representing information objects, including their interrelated relations, is based on a unified relationship matrix (URM). "SimFusion: measuring similarity using unified relationship matrix" in SIGIR 2005: Proceedings of the 28$^{th}$ annual international ACM SIGIR conference on research and development in information retrieval, pages 130-137, W. Xi et al discloses a URM for representing a multi-entity graph.

Using URM, relations between two object types are represented via a relationship matrix $M_{ij}$. The (k, l) entry of matrix $M_{ij}$ represents the strength of the relation between the object pairs ($o_k$, $o_l$) of types $O_i$ and $O_j$ respectively. Relations between objects of the same type are represented by the adjacency matrix $M_{ii}$. The URM matrix U encapsulates all matrices to provide a unified representation of the unified search space.

$$U = \begin{pmatrix} M_{11} & M_{12} & \ldots & M_{1n} \\ M_{21} & M_{22} & \ldots & M_{2n} \\ \vdots & & & \\ M_{n1} & M_{n2} & \ldots & M_{nn} \end{pmatrix}$$

The URM matrix is an elegant representation of the heterogeneous interrelated objects. Differentiation is made between direct relations between objects, given in advance, to indirect relations which are deduced from direct relations. Given two object types, $O_i$, $O_j$ for which no direct relation is given, indirect relations can be deduced between these object types given that these two types are related directly to the same other object type. For example, given the (direct) relationship matrix between users and documents, $M_{ud}$, and the direct relations between documents and tags $M_{dt}$, the indirect relations between user and tags (in the document space) can be deduced by multiplying the corresponding matrices:

$$M_{ut}=M_{ud}*M_{dt}.$$

Similarly, the indirect relations between users in the document space ($M_{uu}$) can be deduced by multiplying the $M_{ud}$ matrix by its transpose:

$$M_{uu}=M_{ud}*\text{Transpose}(M_{ud}).$$

The similarity between objects in the unified space is defined naturally by the inner product of the two vectors representing those objects in the unified space:

$$\text{Sim}(o_k,o_l)=\text{Sum over } 1(o_1,1 \cdot o_2,1)$$

A query in the unified space is also represented as a linear combination of information objects, and objects are ranked according to their similarity to q in the unified space.

One of the main drawbacks of the URM matrix solution is the difficulty to update the (direct and mostly the related indirect) relations between objects. Typical relations are very dynamic in nature and are continually modified over time. For example, when a user u tags an existing document d, then $M_{ud}$, the users-documents relationship matrix, should be updated to include this new relation. Moreover, all other relations must be updated which might be affected by the new relation. In the worst case, updating a direct relation between two objects might lead to an update of the entire URM matrix.

Another drawback is that, for large multi-entry graphs, computation of indirect relations through matrix multiplication could be computationally expensive.

SUMMARY OF THE INVENTION

According to a first aspect of the present invention there is provided a method for information retrieval with unified search between heterogeneous objects, comprising: indexing a first object as a document in a search index; referencing a second object related to the first object in a facet of the document; and storing in the facet of the document a relationship strength between the first and second objects.

According to a second aspect of the present invention there is provided a computer software product for information retrieval with unified search between heterogeneous objects, the product comprising a computer-readable storage medium, storing a computer in which program comprising computer-executable instructions are stored, which instructions, when read executed by a computer, perform the following steps: indexing a first object as a document in a search index; referencing a second object related to the first object in a facet of the document; and storing in the facet of the document a relationship strength between the first and second objects.

According to a third aspect of the present invention there is provided a search index for information retrieval with unified search between heterogeneous objects, comprising: a first object indexed as a document; a facet in the document referencing a second object related to the first object; and a numerical relationship strength between the first and second objects stored in the facet of the document in the search index.

According to a fourth aspect of the present invention there is provided a system for information retrieval with unified search between heterogeneous objects, comprising: a processor; a facet search means for searching a search index in which a first object is indexed as a document with a facet in the document referencing a second object related to the first object and a numerical relationship strength between the first and second objects stored in the facet of the document in the search index; and a scoring means for directly scoring a first object returned in a facet search for a second object based on the relationship strength between the first and second objects.

In this disclosure, a solution to the unified search scenario is provided that enables an efficient update mechanism for relations between objects, as well as efficient search over the heterogeneous data. The solution only indexes direct relations between objects. Indirect relations are computed on the fly during query execution. Thus, during search, object scores are computed by considering direct relations which are extracted directly from the search index, while indirect relations are induced on the fly during query execution.

This approach solves the update problem; only direct relations between objects have to be updated in the index following new coming events, while dependent indirect relations that are dynamically induced from direct relations are computed only on demand.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
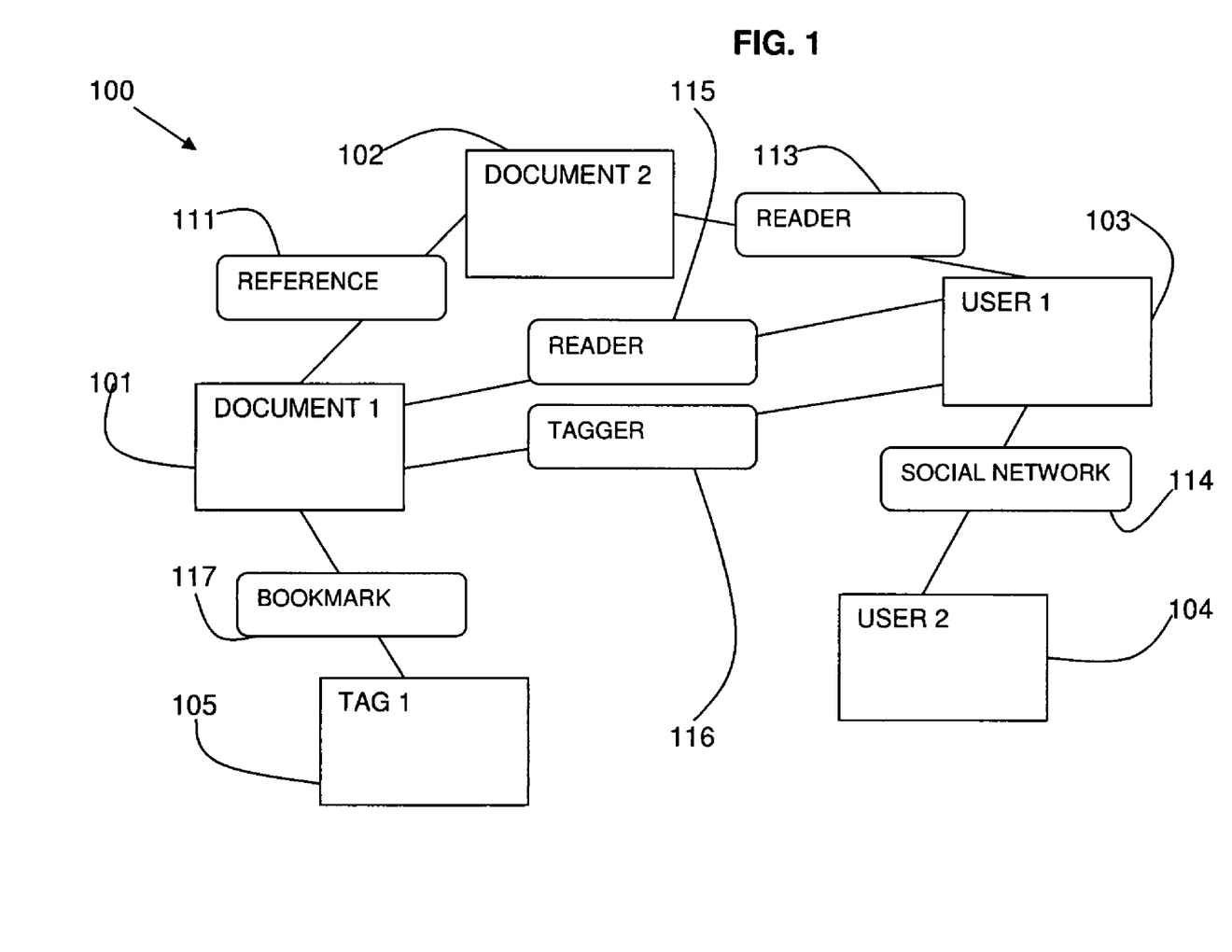
FIG. 1 is a schematic representation of a search space on which the present invention may be operated.

Referring to FIG. 1 a schematic diagram shows a search space 100 with heterogeneous information objects 101-105. The heterogeneous information objects may include documents (web-pages, database records), users (authors, readers, taggers), user tags as provided by collaborative bookmarking systems, and other object types. In the illustrated diagram, the objects are document 1 101, document 2 102, user 1 103, user 2 104, and user tag 1 105.

The objects 101-105 related to each other and the example relationships 111-117 are shown in FIG. 1 as follows:
    Document 1 101 references 111 document 2 101.
    Document 1 101 has author 112 of user 1 103.
    User 1 103 is a reader 113 of document 2 102.
    User 1 103 and user 2 104 are related by a social network 114.
    User 2 104 is a reader 115 of document 1 101.
    User 2 104 is also a tagger 116 of document 1 101.
    Tag 1 105 is a bookmark 117 to document 1 101.
    User 2 104 is the tagger 118 of the tag 1 105.

The described method of unified search represents a single object in the system in two ways: as a retrievable document and as a facet (category) of all the objects it relates to. Each direct relation between two objects is defined by attaching a facet representing one object to a document representing the other object. The relationship strength between objects is represented by weighting the facet-document relationship.

For example, in a unified representation of a collaborative bookmarking system, there are three object types—bookmarked web objects (web-pages), taggers (users), and tags. Each object type is associated with a corresponding document—a web-page document, a user document and a tag document. The content of a web-page document is based on the content of the web object it relates to, as well as all tags and descriptions that users have associated with that object. The content of a user document may include some public information about the user such as name, title, hobbies, projects, papers, etc. A tag document will contain the tag only. There are three obvious relationship types in such a system:
    Relationship of a user to the tagged web-page is represented as a user-type facet of the corresponding web-page document.
    Relationship of a tag with the associated web-page is represented by a tag-type facet of the web-page document.
    Relationship of a user with a tag used for bookmarking is represented as a user-type facet of the corresponding tag document.

In conventional faceted search implementations, each document is associated with a list of categories (facets) it belongs to. Those categories are stored as the document attributes within the search index. During the search for a specific query, the categories of all matched documents are retrieved, and for each category a counter of the number of matched documents is provided. The retrieved categories (facets) then might be used by the searcher to narrow his search to a specific facet.

The extension described is to add to each of the category-document relation a weight that represents the relationship strength. The documents in the index are expanded to include all heterogeneous objects and the facets include categories for all the heterogeneous object types so that a relationship between objects can be defined in the facet index.

When all objects are searched related to a certain object, the result set will contain all entities related directly and indirectly to that object. The directly related objects are extracted by retrieving all entities for which the desired object serves as their facet. Their score is determined according to the relationship strength with the target object.

When a textual query is searched, since all objects are associated with retrievable documents, directly related objects will be retrieved and scored by the underlying search system.

In both cases, the indirectly related objects are extracted by retrieving the facets of the direct results. In the following the scoring mechanism for indirect objects is described based on the multifaceted search implementation. It is also shown that the described scoring mechanism is equivalent to the unified search approach.

Figure 2:
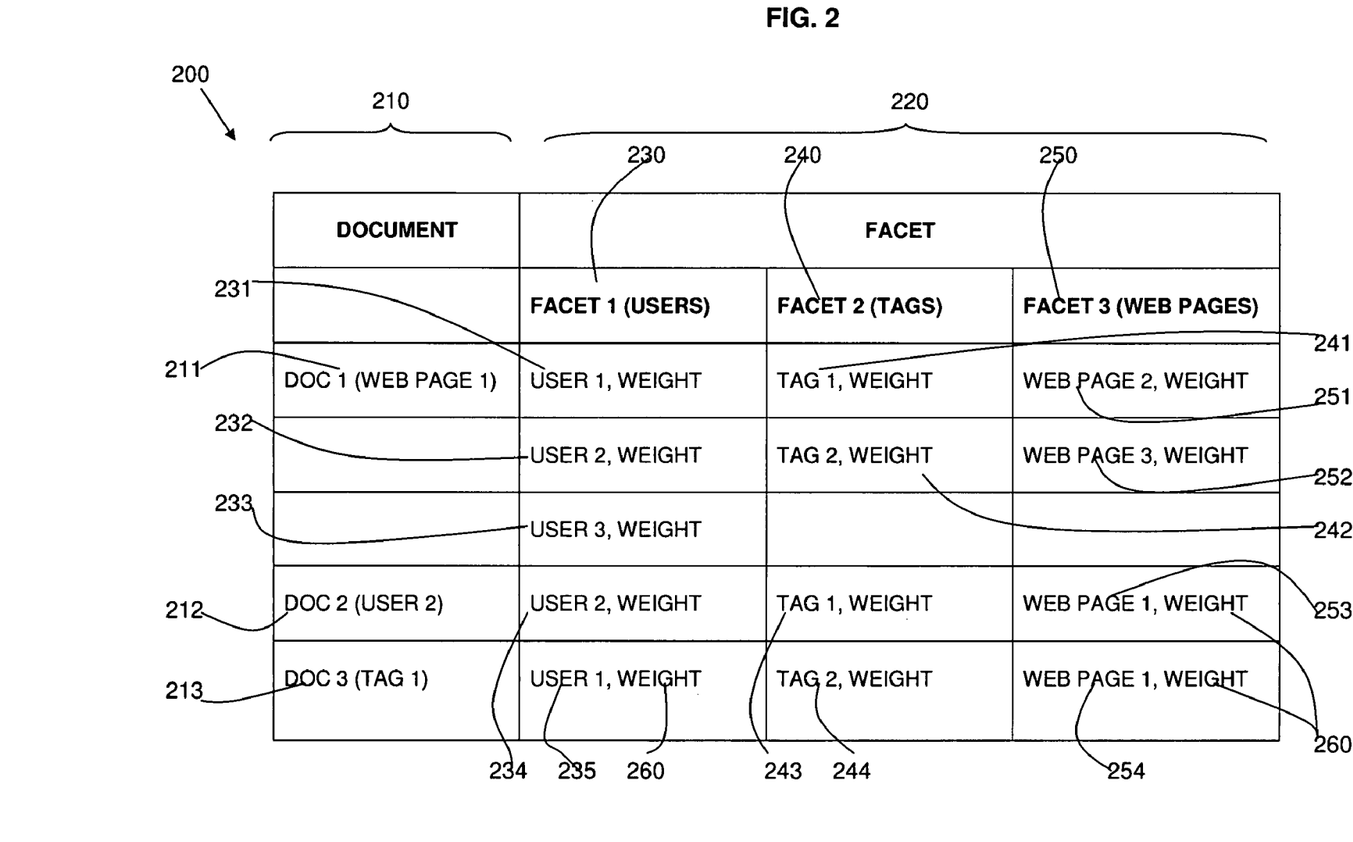
FIG. 2 is a schematic representation of a search index in accordance with the present invention.

Referring to FIG. 2, a schematic diagram shows information 200 stored in an index or database of the described system. The index includes referenced heterogeneous objects 210 in the form of document entries 211-213. In the illustrated example, document 1 111 is a web-page 1, document 2 112 is user 1, and document 3 113 is tag 1.

Each of the document entries 211-213 has facets 220 with three categories of facet 1 230 for user objects, facet 2 240 for tag objects, and facet 3 250 for web-page objects.

In the illustrated example in FIG. 2, the document 1 211 representing web-page 1 has three users 231-233 in its facet 1 category 230, two tags 241-242 in its facet 2 category 240, and two web-pages 251-252 in its facet 3 category 250.

The document 2 112 representing user 1 has a user 234 in its facet 1 category 230, a tag 243 in its facet 2 category 240, and a web-page 253 in facet 3 category.

The document 3 113 representing tag 1 has a user 235 in its facet 1 category 230, a tag 244 in its facet 2 category 240, and a web-page 254 in facet 3 category.

Entries are stored in the index 200 facets 220 with weights 260 of the relationship strength between a heterogeneous object 210 represented as a document 111-113 and a heterogeneous object represented in the facets 220.

During query execution, rather then just counting the number of documents belonging to category C by the faceted search process, the described method sums the multiplication of the (document, category) weight by the document score of all documents related to C. Then, the "score" of a matched category C is the sum of all relationship weights it has with all documents that match the query:

$$Score(C,q) = Sum(\text{over all docs } d \text{ related to } C) weight(d,C) * Score(d,q)$$

The described method uses a weighted facet search solution for efficient implementation of unified search. All existing objects are represented as searchable documents. For two related objects, one of them will be represented as a category of the second one, while the doc-category weight will stand for the relationship strength between the objects.

During the search, all matched documents will be retrieved according to their similarity to the query, and in addition all related categories will be retrieved as facets, each associated with a score that is induced from its relationship with the matched results. For example, in the social search scenario, documents, users, and tags are represented as documents, and in addition users and tags are represented as categories of the documents they are related to.

Multifaceted search aims to combine the two main search approaches in IR:

Navigational Search, which uses a hierarchy structure (taxonomy) to enable users to browse the information space by iteratively narrowing the scope of their quest in a predetermined order.

Direct Search, which allows users to simply write their queries as a bag of words in a text box.

In a typical multifaceted search interface, users start by entering a query into a search box. The system uses this query to perform a full-text search, and then offers navigational refinement on the results of that search by categorizing the search results into predefined facets. Users are able to refine their query by narrowing the search into several of the identified facets.

The described unified search solution is based on a multifaceted search library which allows flexible and dynamic aggregation over faceted data. In one embodiment, a multifaceted search library may be developed upon the open-source search engine, Lucene (Lucene is a trade mark of Apache Software Foundation.). Lucene provides an index and search library. At the core of Lucene's logical architecture is the idea of a document containing fields of text. This flexibility allows Lucene's application programming interface to be independent of file format. Text from documents, as well as many others can all be indexed so long as their textual information can be extracted.

The described unified search solution not only counts the number of results across several facets, but also supports richer aggregations of numeric and Boolean expressions over the set of results belonging to a given facet. A facet's taxonomy is built on the fly, implicitly inferring the facet hierarchy according to given facets.

The rich aggregations and dynamic taxonomy are prerequisites to enable the social search schema described above, as well as additional features that are added to the multifaceted search library:

1. While previously the relation between a facet and a document was binary (the facet could be either attached to the document or not), the current library supports weighted attachment of facets to documents.

2. While previously it was possible to return a non-ranked set of documents which are attached with a certain facet, the current library enables ranked set, where the score returned for each document is the relation strength between the query facet and the document.

3. Facets and numeric fields can now be attached to documents already indexed, whereas before they had to be given during index building.

4. A query-independent static score can be associated with facets. Since facets are used to represent social objects in the system, this score will be used for social ranking the system objects. There are several types of entities that can be statically scored, according to several characteristics, and those static scores can be considered while ranking those entities for a given query. Static scores are computed differently for different object types.

The system supports three types of queries: entity queries, textual queries, and hybrid queries. The input of entity query is a specific object (e.g. a user of the system), the input of textual query is a regular term-based query based on the search engine's query syntax, and the input of hybrid query is a combination of entity and textual queries.

The result of all queries is a list of directly related documents with scores, which are later used to calculate indirect relations. For an entity query, the score reflects the relation weight between the matching document and the facet representing the query object. For a textual query, the search engine's scoring mechanism is used. For a hybrid query subqueries are combined using the search engine's support of Boolean operators, including separate boosting of sub-queries.

In the prior art unified search scenario using URM, the strength of indirect relation between object $o_1$ and object $o_2$ is:

$$\text{Score}(o_1, o_2) = \sum_o U(o_1, o) \cdot U(o, o_2) \quad (1)$$

where $U(o, o_1)$ is the corresponding entry in the URM matrix. This computation is equivalent to squaring the URM matrix which provides a two-stages path between any two objects in the multi-entity graph.

Equation 1 can be generalized to score objects based on their indirect relations with any query. For example, for a textual query q, all objects can be scored according to their textual similarity to q, since every object is represented by a textual document. For an entity query o, all objects can be scored according to their direct relationship strength with o. The following score vector, $\vec{s}_o(q)$, provides the (direct) scores of all N objects in the system to the query:

$$\vec{s}_o(q) = (s_o(q, o_1), \ldots, s_o(q, o_N)).$$

By multiplying this score vector with U, all objects are scored based on their indirect relationship with q:

$$\vec{s}_1(q) = U \cdot \vec{s}_o(q) \quad (2)$$

Note that Equation 2 can be employed iteratively to traverse longer paths in the entity graph.
The implementation of Equation 2 requires two stages:
1. Retrieve and score objects that are directly related to the query; and
2. Multiply the score vector by the URM matrix to retrieve indirectly related objects.

In order to enable search in reasonable time, this computation must be efficient and scalable.

The described method shows how this computation is implemented efficiently based on a multifaceted search library.

For all query types the scores of directly related objects are equivalent to the scores as represented by $\vec{s}_o(q)$.

The score of an indirectly related object, o, is determined by aggregating its relationship strength with all matching documents multiplied by their direct score:

$$s_1(q, o) = \sum_{i=1}^{N} s_o(q, o_i) \cdot w(o, o_i) \quad \text{(Equivalent to Equation 2)}$$

where $w(o, o_i)$ is the relationship strength between the document $o_i$ and its facet o. This computation is implemented by the described facet-search mechanism for aggregating numeric expression over the set of matching documents related to a specific facet. It is easy to see that since $w(o, o_i) = U(o, o_i)$, this facet based computation is equivalent to Equation 2.

In addition, objects can have a query-independent static score which scores according to their relative popularity, or authority and the static score may be applied to the direct and indirect object results. The static scores may be computed using various methods depending on the object type.

For web-pages the static score may be determined according to the number of bookmarks and comments associated with the page (log(X+1) where X is the number of bookmarks+comments).

In the social search scenario, a user static score can be proportional to the inverse number of documents he relates to, similarly to the idf part in the tf-idf scoring mechanism where terms are weighted in inverse relation to the number of documents they relate to. For example, assume two users who are scored the same according to their relations to the matched documents for the query, but one of them is related to many more documents, then this user will be score lower following his low idf value.

Such query independent scores may be based, for example, on the FolkRank score as described in "Information retrieval in folksonomies: Search and ranking" A. Hotho et al in ESWC '06, Proceedings of the $3^{rd}$ European Semantic Web Conference, pages 411-426, 2006.

In an example embodiment used in the described method, query independent scores are based on the inverse entity frequency score (ief):

$$ief = \log\left(\frac{N}{N_o}\right) \quad (3)$$

where N stands for the number of all objects in the system and $N_o$ stands for the number of objects related to o. Similarly to the vector-space idf score for terms, the ief score "punishes" objects that are related to many objects in general, hence are less specific for a given query.

The final score of object o for query q is determined by multiplying the query dependent score with the object static score, for example using the ief embodiment of the static score this would be:

$$\text{Score}(q, o) = s_1(q, o) \cdot ief(o) \quad (4)$$

In the described method and system indirect related objects are represented by accumulating all facets of the same type. The "user" facet, for example, will include all users that are related to the matching documents, each associated with a score as computed by facet-based expression. Similarly, each facet, representing one of the object types, will include all related objects of this type associated with a score expressing their indirectly related strength with the query object.

Note that an object may be related both directly and indirectly to the query object. In this case it is possible to combine the direct score with the indirect score of that object, or maintain separate result sets for directly and indirectly related objects. If the latter is implemented, the search results include all objects for which their associated documents are directly related to the query, as well as all indirectly related objects which are related to those documents, scored according to Equation 4, and clustered by their types.

Figure 3:
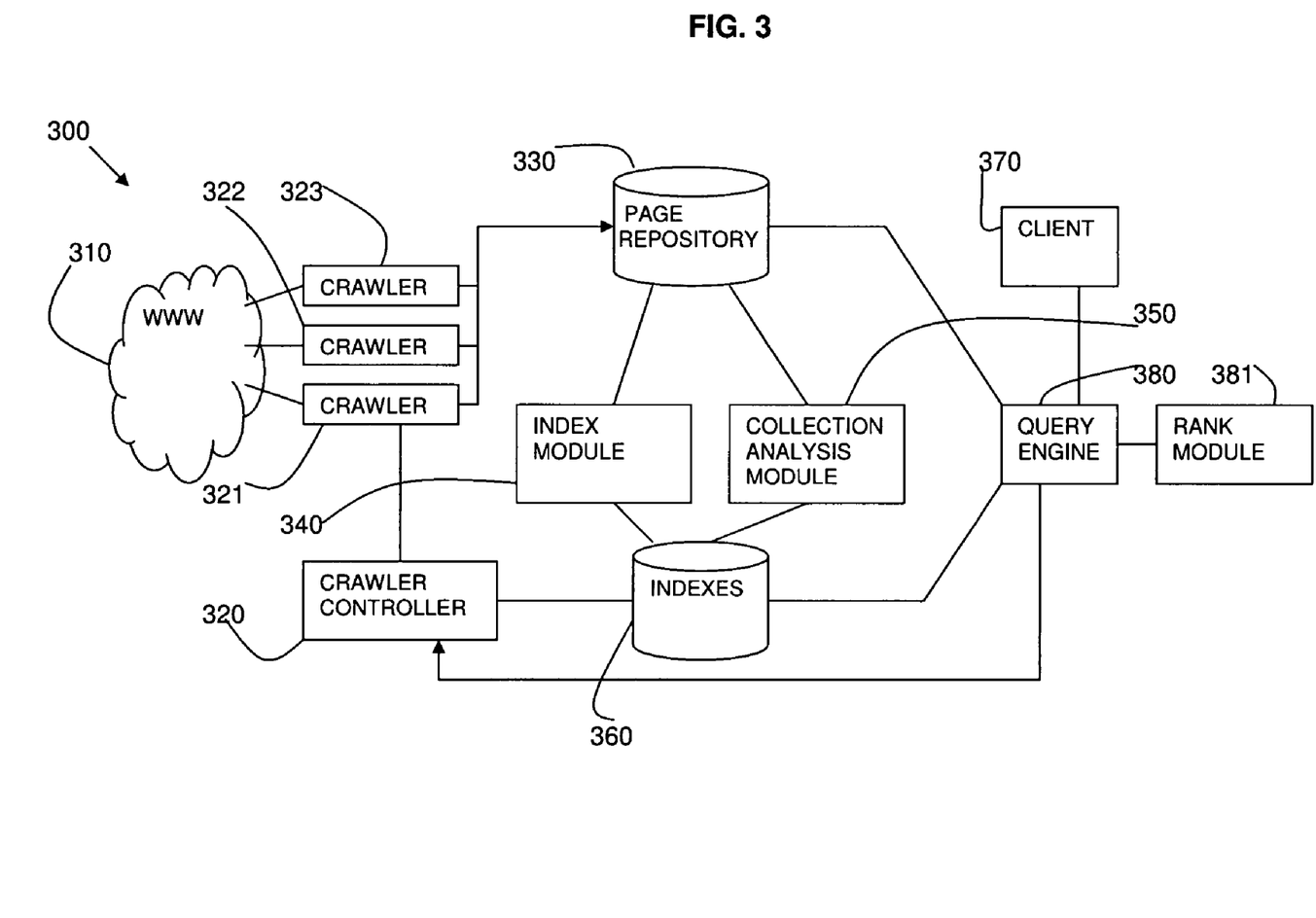
FIG. 3 is a block diagram of a search system as known in the art.

The described method calculates only two levels of relatedness, but this limitation is not inherent—it is possible to use the ranked list of indirectly related objects as the basis of another multifaceted search, traversing paths of length 3 in the entity graph, and this iteration can continue further Referring to FIG. 3, an embodiment of an information retrieval system in the form of a search engine 300 is shown as known in the prior art.

A search engine 300 fetches documents to be indexed from the World Wide Web 310, or from resources on an intranet. The search engine 300 includes a crawl controller 320 which controls multiple crawler applications 321-323 which fetch documents which are stored in a page repository 330.

The documents stored in the page repository 330 are profiled by a collection analysis module 350 and indexed by an index module 340. Indexes 360 are maintained with text, structure, and utility information of the documents.

A client 370 can input a query to a query engine 380 which retrieves relevant documents from the page repository 330. The query engine 380 may include a ranking module 381 for ranking returned documents. The returned documents are provided as results to the client 370. User feedback from the query engine 380 may be provided to the crawl controller 320 to influence the crawling.

Figure 4:
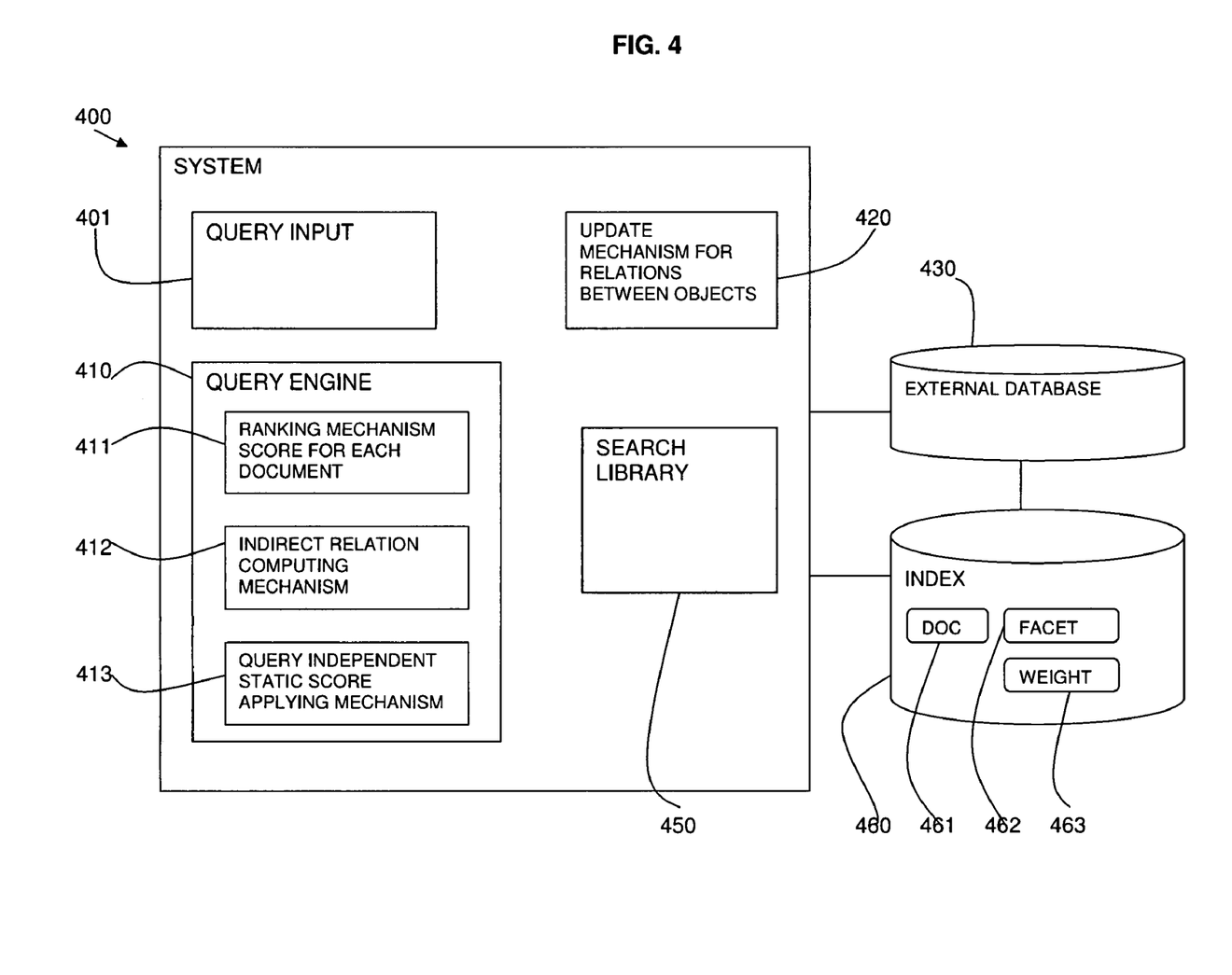
FIG. 4 is a block diagram of a search system in accordance with the present invention.

Referring to FIG. 4 a block diagram shows a search system 400 in accordance with the described system. The search system 400 includes an index 460 and search library 450 with objects indexed in the system in two ways: as a retrievable document 461 and as a facet (category) 462 of all the objects it relates to. Each direct relation between two objects is defined by attaching a facet representing one object to a document representing the other object. The relationship strength between objects is represented by weighting 463 the facet-document relationship.

The search system 400 includes a query input mechanism 401 for inputting a text query and/or a facet query. A query engine 410 includes a ranking mechanism 411 for scoring for each document based on the relation strength between a query facet and a document. The query engine 410 also includes an indirect relation computation mechanism 412 for computing indirect relation scores between objects based on the indexed direct relation scores between objects. The query engine 410 may also include a query-independent static score applying mechanism 413 described further below.

The search system 400 also includes an update mechanism 420 for updating relations between objects in the index. The updating mechanism 420 can be used to update existing relation weightings and to add facets and weightings to objects already stored as documents in the index. The changes may be stored in an external database 430 as described further below.

The multifaceted search model and library provide a solution to the two issues raised earlier regarding usage of the URM matrix for social search: the need for efficient computation of indirect relations and efficient dynamic updates. An efficient runtime calculation of facets is used for the computation of indirect relations.

Efficient dynamic updates result from a mechanism which enables post-indexing addition (and removal) of facets and numeric fields to documents, by storing the changes in an external database. When iterating over facets or numeric fields, database queries are executed in addition to the regular Lucene iteration, and the results of both are combined to supply the most up-to-date data.

Since the performance of search runtime is highly dependent on the time it takes to iterate over all occurrences of a certain term, and since data structures in Lucene are optimized for fast iteration, database queries involved might be relatively expensive and harm performance. Therefore, the database content will be periodically incorporated into the Lucene index. This approach fits Lucene's indexing schema which is based on creation of small indexes and incremental merges. In similar fashion, the database content is merged into the Lucene index to which it refers, during index merges, and the database containing only most up-to-date updates can be kept relatively small.

Figure 5:
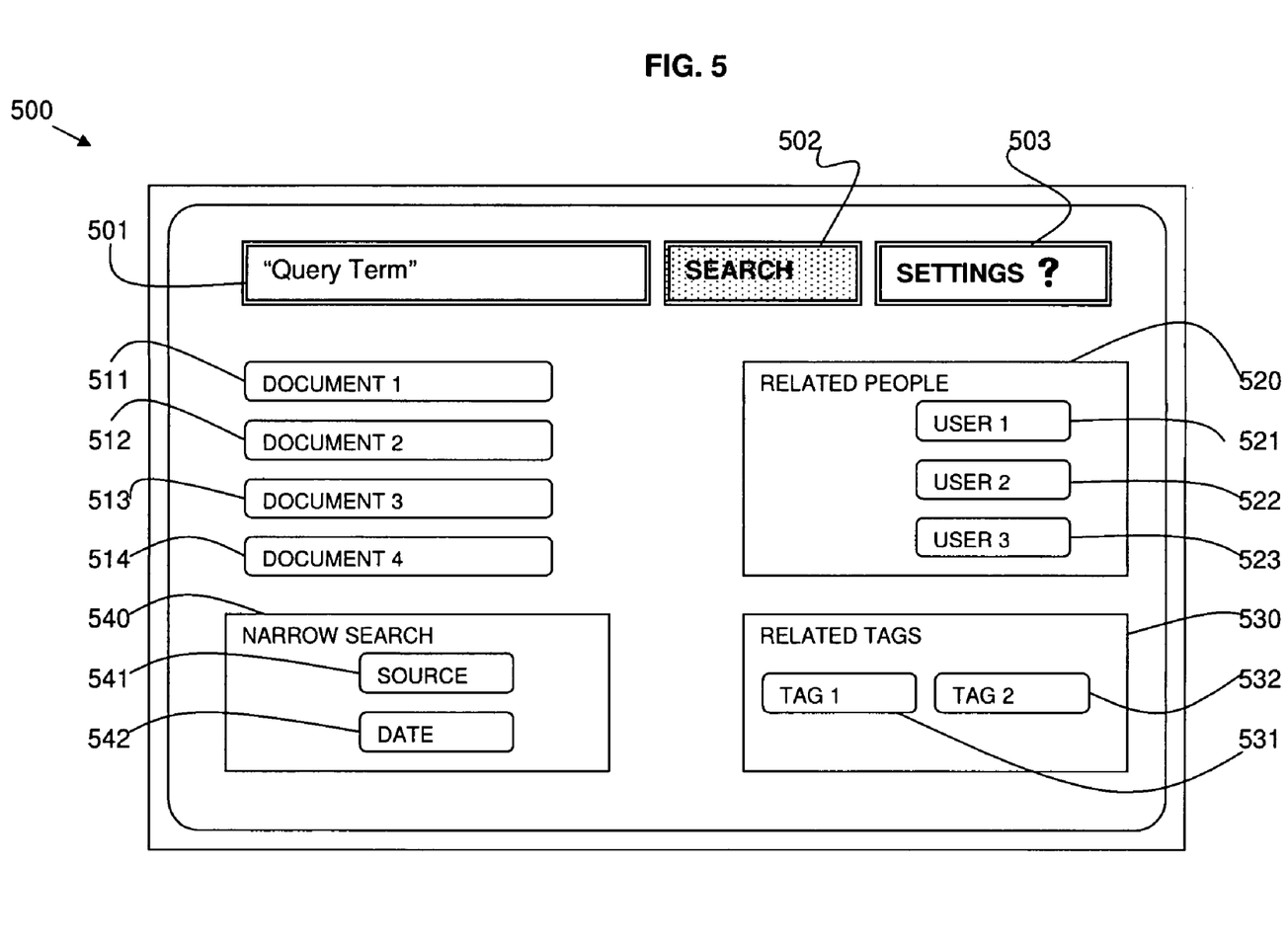
FIG. 5 is a representation of a graphical user interface showing the results of a system in accordance with the present invention.

A social search application GUI is shown in FIG. 5 in the form of a screen 500 of the application for a textual query and/or an entity query.

A text query input box 501 is provided with a search activate button 502. A settings menu 503 is also provided for an entity search.

The returned document results are listed 511-514 with links to the returned documents. In addition, a list of "related people" 520 is returned which shows the users 521-523 deemed related to the set of documents retrieved 511-514. A list of related tags 530 is also returned in the form of a tag cloud showing the frequency of tags 531, 532 used to describe the set of retrieved documents 511-514. A list of additional categories 540 is also provided with which the information can be further explored, for example sources 541 of the documents 511-514 and dates 542 of the documents 511-514.

The searchable indexed objects are documents, users and tags, and the direct relations are (doc-user), and (doc-tag). When searching for a textual query, the system retrieves relevant documents (according to their similarity to the query) as well as related users and related tags. When searching for an entity such as a specific user or specific tag, the system provides direct related documents (all documents directly related to this specific object) as well as all indirect related users and tags to the given query.

The document search results are a mix of blogs, book marked pages, and personal profiles. As described above, for a textual query all relevant documents are scored according to their relevance to the query. For an entity query (a user or a tag query) documents are scored according to their relationship strength with the queried entity.

For all query types, the document's textual score is multiplied by the document's independent static score, ss(d)=log (X+2), where X is the number of the page's bookmarks and comments.

The list of related users shows people that bookmarked a relevant document, posted a relevant blog entry, or commented on such an entry. Users are scored by the equation $$s_1(q, o) = \sum_{i=1}^{N} s_o(q, o_i) \cdot w(o, o_i),$$

while their static score is set according to their ief score, $$ief = \log\left(\frac{N}{N_o}\right)$$

With the final score Score(q,o)=$s_1$(q,o)·ief(o).

It is important to note that those users are not necessarily experts on the topic. True experts who never bookmarked neither blogged will never be retrieved by the system. This set of retrieved users, who found the topic's related material interesting enough for tagging or blogging, can be considered as a virtual community of employees, sharing common interests on the topic searched for.

The set of related tags are represented by a tag cloud which is a list of tags related to the retrieved documents. Tags are scored exactly as users, according to their relationship strength with the retrieved documents, and their ief score. The tag score controls its font size in the cloud. In addition the system provides several other facets for supporting easy navigation within the search results.

Figure 6A:
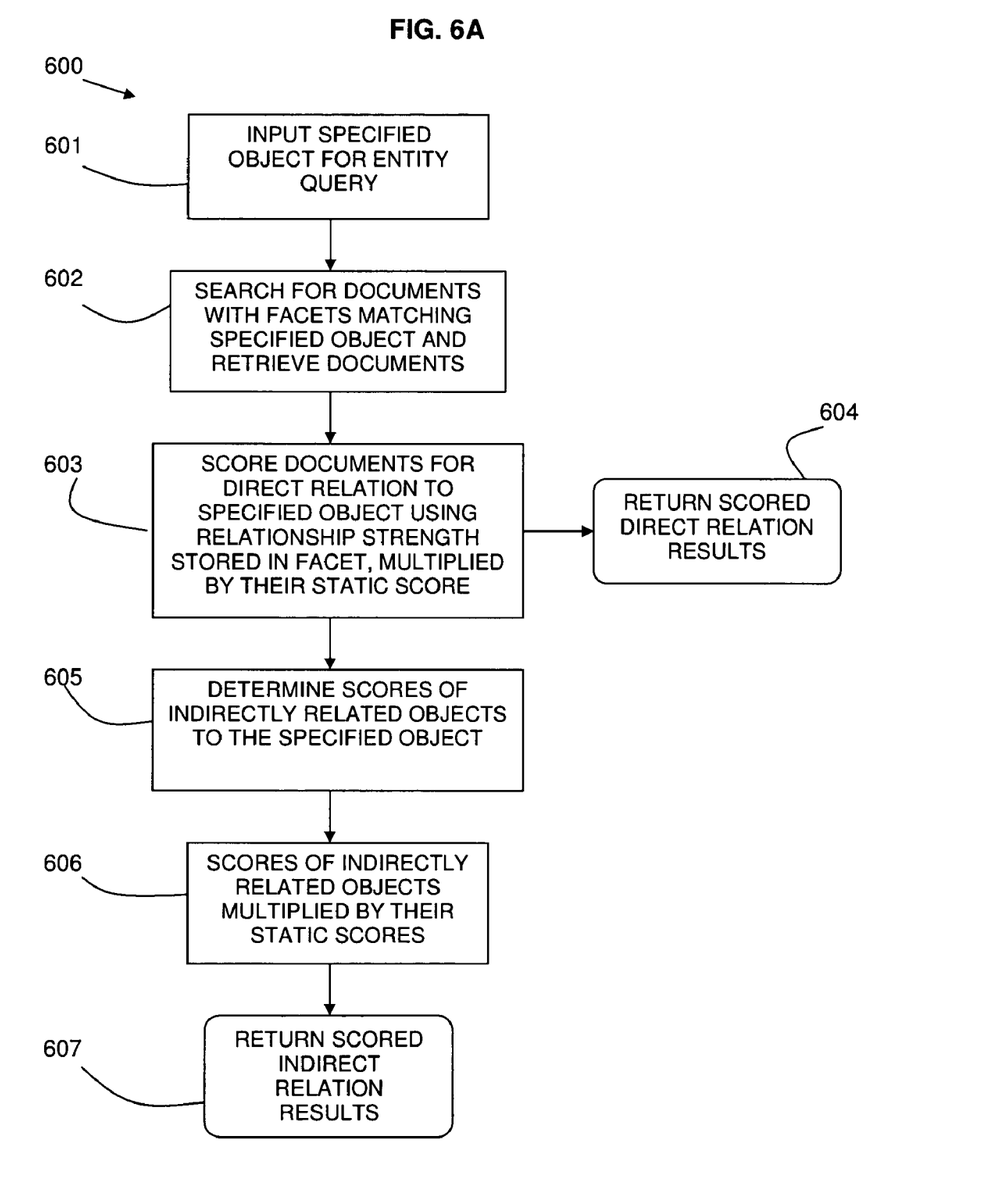
FIGS. 6A, 6B and 6C are flow diagrams of methods of information retrieval in accordance with aspects of the present invention.
Figure 6B:
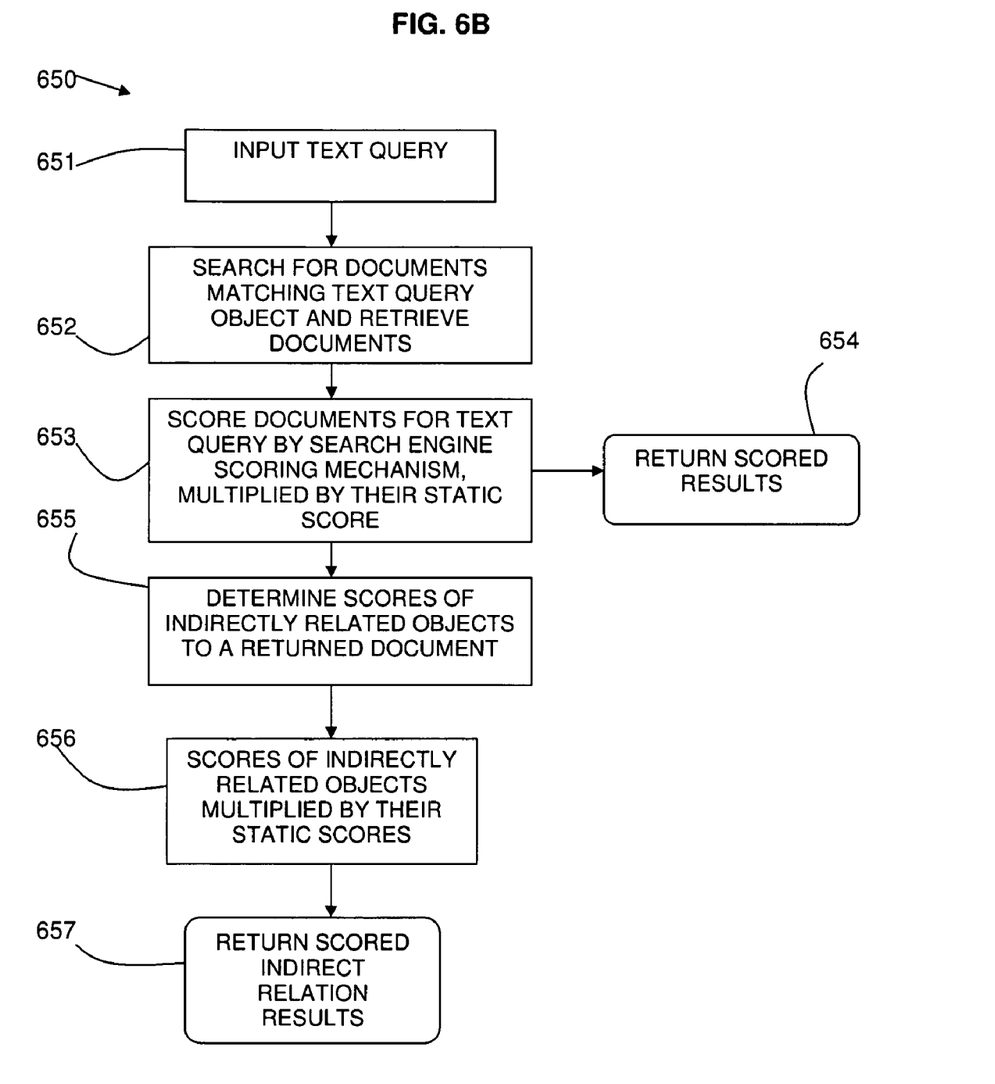
Figure 6C:
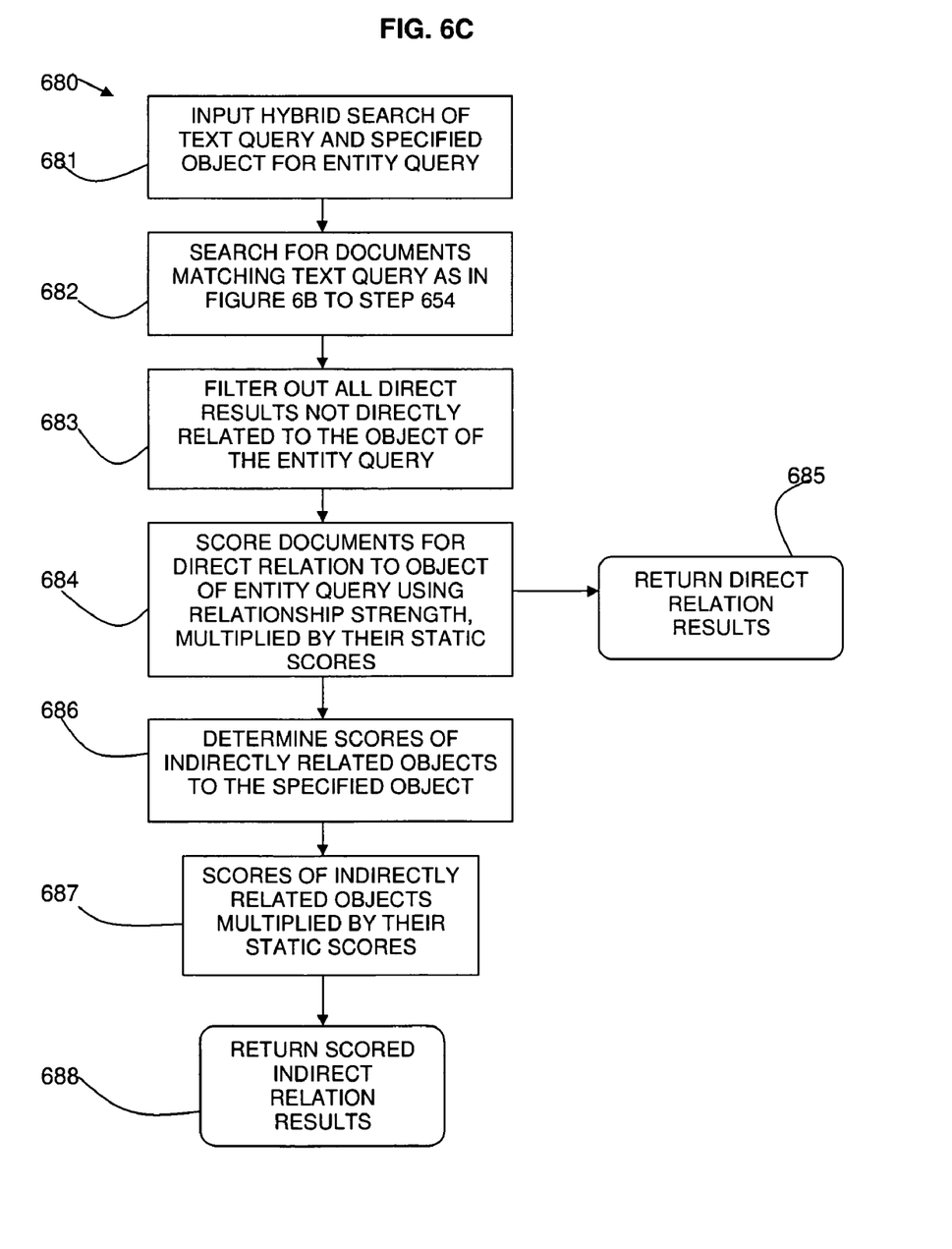

Referring to FIGS. 6A, 6B and 6B flow diagrams 600, 650, 680 are shown of methods of searching and scoring using the described method.

In FIG. 6A, the flow diagram 600 shows a navigation search using an entity query inputting a specified object 601.

A search 602 is made for documents with facets matching the specified object and the documents are retrieved. The documents are scored 603 for their direct relation to the specified object by using their relationship strength stored in the facet for the specified object, multiplied by the query-independent static scores for the matching documents. The direct relation scored documents are returned 604.

The scores of indirectly related objects to the specified object are determined 605 by aggregating the direct relationship strengths between all matching documents and the indirectly related object multiplied by the document's direct score to the specified object.

The scores of indirectly related objects are multiplied 606 by their static score to determine their final score. The scored results for indirectly related objects are returned 607.

In FIG. 6B, the flow diagram 650 shows a text query search starting with an input of a text query 651.

A search 652 is made for retrievable documents (objects stored as documents in the index) matching the text query and the matching documents are retrieved. The documents are scored 653 for the text query using the search engine scoring mechanism, multiplied by query-independent static scores for the matching documents. The scored results are returned 654.

The scores of indirectly related objects to a returned document are determined 655 by aggregating the direct relationship strengths between all matching documents and the indirectly related object multiplied by the document's direct score to the specified object.

The scores of indirectly related objects are multiplied 656 by their static scores to determine their final score. The scored results for indirectly related objects are returned 657.

In FIG. 6C, the flow diagram 680 shows a hybrid text query and entity query. The flow starts with an input 681 of a text query and specified object for entity query.

A search 682 is made for documents matching the text query as in FIG. 6B up to step 654 of returning direct results. All results not directly related to the object of the entity query are filtered out 683. The filtered documents are scored 684 for direct relation to the object of the entity query using the stored relationship strength in the face, multiplied by the query-independent static scores for the filtered documents. The direct relation results are returned 685.

The scores of indirectly related objects to the specified object are determined 686 by aggregating the direct relationship strengths between all matching documents and the indirectly related object multiplied by the document's direct score to the specified object.

The scores of indirectly related objects are multiplied 687 by their static score to determine their final score. The scored results for indirectly related objects are returned 688.

Personalization

Search results can be personalized for the searcher given the relations between the searcher to searchable entities of the system. Those relations are taken into consideration while scoring the objects retrieved by the system. One simple possibility is to multiply the score of an entity e for a given query q by the strength of the relation of the searcher to this specific entity e.

For example, given a social network that specifies the strength of relations between the searcher to other users, multiply the score users get from the system with respect to a given query, by the strength of their relation to the searcher. In this way, users that are strongly related to the searcher are biased by the retrieval system. The search system can also mark retrieved users who are strongly related to the searcher. It is worth noting that such a personalization functionality should be optional since there are usage scenarios where personalization is not desirable.

Document Level Security

Consider that each document to be indexed has an Access Control List (ACL)—a list of users that are allowed to read this document. These ACLs should also effect unified search: If you are not allowed to read a document, you are also not allowed to find out anything about what is related to it from a search.

For example, assume searching for a query that brings up "John Doe" as a related person, but if the document that matched the query which is related to "John Doe" is unreadable to you, searching for "this specific query should not bring up "John Doe" (unless of course there are other, matched documents with this relationship).

The faceted-search-based method handles these ACLs very naturally. The faceted search starts by listing all the matching documents, and during this process unreadable (for the current user) documents are discarded from this list, and then only the related-user facets are calculated. This gives exactly the desired behavior, with no extra calculations or complications.

On the other hand, the URM method does not deal well with ACLs. With that method, the indirect relationship between the query and people is calculated once (to be saved in a matrix). The URM matrix does not provide the evidence why a specific user is indirectly related to a given query and therefore there is no easy way to identify whether this "related" user is allowable or the searcher.

Position-Based Queries

Another advantage of weighted face based implementation is that it supports natural handling of proximity based queries (e.g phrase queries, or span queries). In the weighted facet based implementation such queries are handled regularly and the set of matched documents are analyzed as described above to retrieve other related entities. In the URM solution, in order to support proximity-based queries we have to keep for each matrix entry the full list of elements that contribute to this relation strength, including positional information. Such a solution is possible but is non-feasible.

Figure 7:
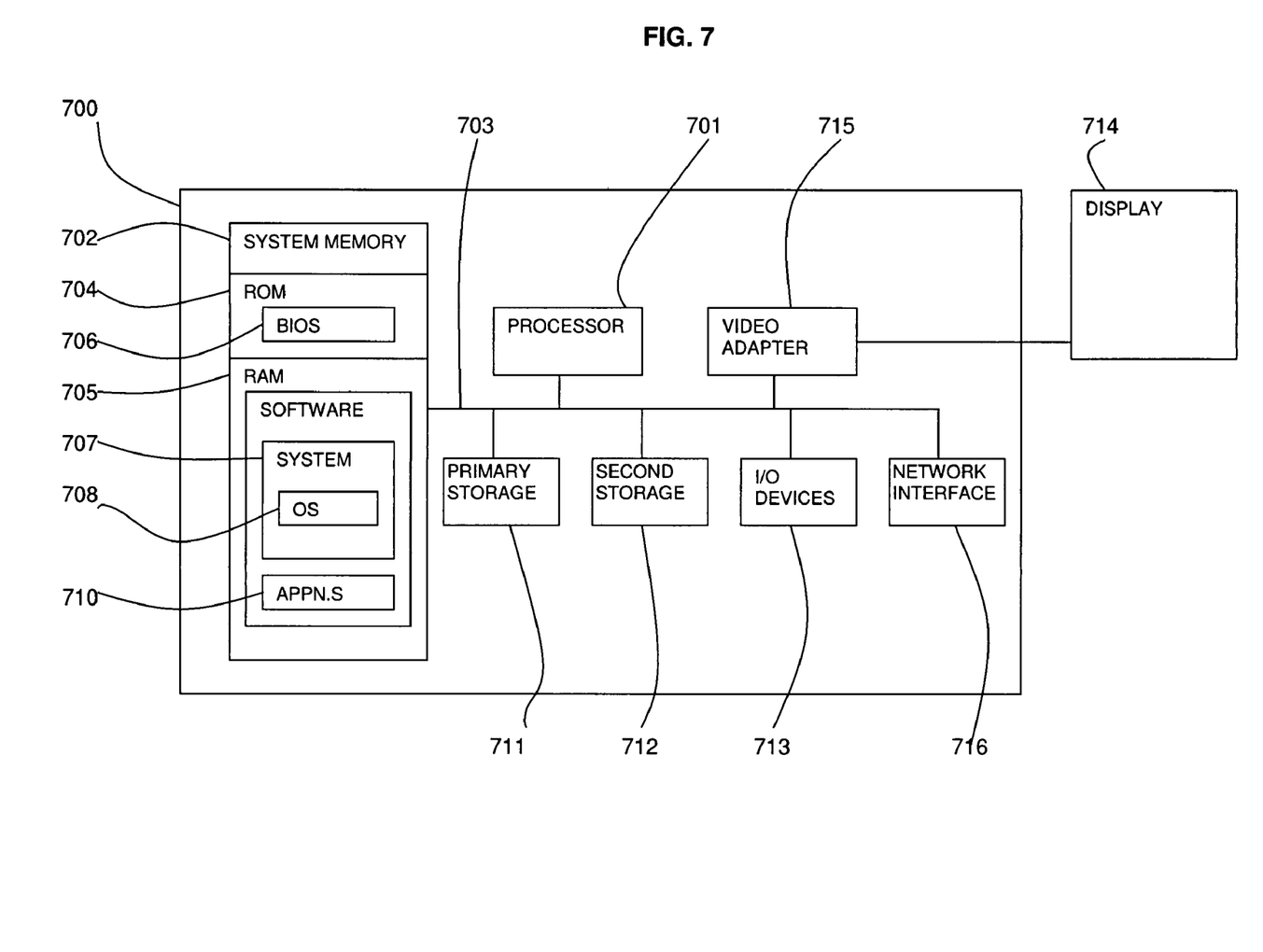
FIG. 7 is a block diagram of a computer system in which the present invention may be implemented.

Referring to FIG. 7, an exemplary system for implementing a search system includes a data processing system 700 suitable for storing and/or executing program code including at least one processor 701 coupled directly or indirectly to memory elements through a bus system 703. The memory elements can include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. System software 707 may be stored in RAM 705 including operating system software 708. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 can be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for information retrieval with unified search between heterogeneous objects belonging to multiple different categories, the method comprising:
    defining a search index to reference multiple documents, the search index comprising one or more facets for each document, the facets corresponding to attributes of the documents;
    associating the categories of the objects with respective facets in the search index, including at least first and second facets associated respectively with first and second categories;
    indexing a first object, which belongs to the first category, as a document in the search index;
    identifying a second object, which belongs to the second category, as being related to the first object with a given relationship strength;
    referencing the second object together with the relationship strength between the first and second objects in the second facet of the document that indexes the first object in the search index;
    searching for objects by applying a query to the search index;
    retrieving document matches to the query to result in retrieved objects; and
    scoring the retrieved objects by a search engine scoring method,
    wherein applying the query comprises searching for documents by specifying a facet of the documents in the search index, and
    wherein retrieving the document matches comprises filtering out document matches from the query which do not include the specified facet,
    wherein scoring the retrieved objects comprises computing scores by the stored relationship strength of the retrieved objects to the specified facet,
    wherein retrieving the document matches comprises retrieving an indirect object having an indirect relation to a query object, and
    wherein computing the scores comprises aggregating relationship strengths between the indirect object and the query object by multiplying relationship strengths between the indirect object and another object that is directly related to the query object.

2. The method of claim 1, wherein the first and second objects are any one of the group of: documents, database records, users, user tags, user bookmarks, social network entries, or other object types which are searchable, and wherein multiple heterogeneous objects are related to the first object and are referenced in multiple facets of the document, each with a stored relationship strength to the first object.

3. The method of claim 1, including:
    searching for documents by a specified facet;
    retrieving document matches by a facet search for the specified facet, wherein the document matches are retrieved objects; and
    scoring the retrieved objects by the stored relationship strength of the retrieved objects to the specified facet.

4. The method of claim 1, wherein multiplying the relationship strengths comprises multiplying a score for a retrieved object or an indirect object by a static score representing a relative importance of the object.

5. The method of claim 1, including updating the facets and relationship strengths in the search index after indexing of the first object.

6. The method of claim 5, including storing updates the of facets and relationship strengths in a database external to the index and combining the updates to index results during searching.

7. The method of claim 6, including periodically updating the index from the external database.

8. The method of claim 1, wherein multiplying the relationship strengths is carried out iteratively to compute higher order relationships.

9. The method of claim 1, wherein the indirect object has a direct and an indirect score and computing the scores includes combining the direct and indirect scores of the indirect object.

10. A method for information retrieval with unified search between heterogeneous objects belonging to multiple different categories, the method comprising:
    defining a search index to reference multiple documents, the search index comprising one or more facets for each document, the facets corresponding to attributes of the documents;
    associating the categories of the objects with respective facets in the search index, including at least first and second facets associated respectively with first and second categories;
    indexing a first object, which belongs to the first category, as a document in the search index;
    identifying a second object, which belongs to the second category, as being related to the first object with a given relationship strength;
    referencing the second object together with the relationship strength between the first and second objects in the second facet of the document that indexes the first object in the search index; and
    scoring objects retrieved in a search by multiplying the relationship strength between a searcher and the searchable objects.

11. The method of claim 1, wherein a document in a search index has an associated list of users allowed to access the document, and the method includes discarding documents returned in search results of a search by a user if the user is not on the list.

12. A computer software product for information retrieval with unified search between heterogeneous objects belonging to multiple different categories, the product comprising a computer-readable storage medium, storing a computer program comprising computer-executable instructions, which instructions, when read and executed by a computer, perform the following steps:
   defining a search index to reference multiple documents, the search index comprising one or more facets for each document, the facets corresponding to attributes of the documents;
   associating the categories of the objects with respective facets in the search index, including at least first and second facets associated respectively with first and second categories;
   indexing a first object, which belongs to the first category, as a document in the search index;
   identifying a second object, which belongs to the second category, as being related to the first object with a given relationship strength;
   referencing the second object together with the relationship strength between the first and second objects in the second facet of the document that indexes the first object in the search index;
   searching for objects by applying a query to the search index;
   retrieving document matches to the query to result in retrieved objects; and
   scoring the retrieved objects by a search engine scoring method,
   wherein applying the query comprises searching for documents by specifying a facet of the documents in the search index, and
   wherein retrieving the document matches comprises filtering out document matches from the query which do not include the specified facet,
   wherein scoring the retrieved objects comprises computing scores by the stored relationship strength of the retrieved objects to the specified facet,
   wherein retrieving the document matches comprises retrieving an indirect object having an indirect relation to a query object, and
   wherein computing the scores comprises aggregating relationship strengths between the indirect object and the query object by multiplying relationship strengths between the indirect object and another object that is directly related to the query object.

13. A system for information retrieval with unified search between heterogeneous objects belonging to multiple different categories, the system comprising:
   a memory, for storing a search index to reference multiple documents, the search index comprising one or more facets for each document, the facets corresponding to attributes of the documents; and
   a processor, which is configured to associate the categories of the objects with respective facets in the search index, including at least first and second facets associated respectively with first and second categories, to index a first object, which belongs to the first category, as a document in the search index, to identify a second object, which belongs to the second category, as being related to the first object with a given relationship strength, and to reference the second object together with the relationship strength between the first and second objects in the second facet of the document that indexes the first object in the search index,
   wherein the processor is configured to perform the steps of:
   searching for objects by applying a query to the search index;
   retrieving document matches to the query to result in retrieved objects; and
   scoring the retrieved objects by a search engine scoring method,
   wherein applying the query comprises searching for documents by specifying a facet of the documents in the search index, and
   wherein retrieving the document matches comprises filtering out document matches from the query which do not include the specified facet,
   wherein scoring the retrieved objects comprises computing scores by the stored relationship strength of the retrieved objects to the specified facet,
   wherein retrieving the document matches comprises retrieving an indirect object having an indirect relation to a query object, and
   wherein computing the scores comprises aggregating relationship strengths between the indirect object and the query object by multiplying relationship strengths between the indirect object and another object that is directly related to the query object.

14. The system of claim 13, including a database external to the index for storing updates to document facets and numerical relationship strengths.

15. The system of claim 13, wherein the processor is configured to update facets and relationship strengths in the search index after indexing of the first object.

* * * * *